INVENTOR.
HOWARD M. LAYTON
BY
ATTORNEY

** 3,348,556
TEMPERATURE REGULATION OF FLUID BATHS
Howard M. Layton, Ossining, N.Y., assignor to Interlab,
Inc., New York, N.Y., a corporation of New York
Filed May 27, 1965, Ser. No. 459,321
7 Claims. (Cl. 134—57)

ABSTRACT OF THE DISCLOSURE

A temperature regulated fluid bath in which a permeable basket is suspended within a tank containing the fluid and is spaced from the wall of the tank to define an external fluid region, a rotary drum being disposed concentrically within this region to agitate the fluid therein to produce mixing currrents which penetrate the basket.

---

This invention relates generally to temperature-regulated fluid baths, and more particularly to an arrangement for controlling the temperature of an ultrasonically activated bath so as to maintain a desired constant temperature level therein which is uniform throughout the bath, without creating excessive turbulence therein.

Ultrasonic techniques are now widely used to effect cleaning of parts, the cleaning action depending on cavitation and acceleration of the cleaning fluid in which the part is immersed. Similar techniques are employed for many medical laboratory processes, for micro-electronic rinsing and etching, and in other industrial operations.

It is often essential that the temperature of the ultrasonically activated fluid be precisely controlled, and that the fluid temperature be constant and uniform throughout the bath. Usually this is accomplished by a combination of heating and cooling units associated with the tank, the units being thermostatically controlled as a function of fluid temperature. Inasmuch as fluid is a relatively poor thermal conductor, it is also necessary to agitate the fluid in order to create mixing currents therein to transmit and distribute the temperature changes introduced by the heating and cooling units. Otherwise, hot and cold regions will exist within the bath, which are detrimental to the process.

The mixing action was heretofore obtained by stirring devices in the form of motor-driven propellers rotating at high speed and producing a high order of turbulence in a localized area within the bath. While such devices serve effectively to agitate the fluid and thereby reduce thermal lag to bring about a uniform temperature within the bath, they at the same time interfere with the ultrasonic process.

The reason for this is that the turbulence and air entrainment resulting from the action of standard stirring devices have an adverse effect on the cavitation efficiency of the fluids. On the other hand, if the stirring device is reduced in speed to prevent excessive turbulence, it ceases to be effective. Moreover, the placement of the stirring device within the bath is at the expense of useable work space therein, and may in some instances contaminate the fluid.

In view of the foregoing, it is the main object of this invention to provide a technique and an arrangement for continuously agitating a fluid at low velocity while imposing the agitation forces over a broad fluid boundary, thereby bringing about a rapid mixing action throughout all regions of the bath, which renders the temperature uniform without, however, generating harmful turbulence effects.

The significant distinction between the invention and prior arrangements resides in the broad diffusion of the agitation forces as distinguished from a concentrated or localized application, thus making it possible to employ low-velocity agitation which does not impair cavitation efficiency and is nevertheless effective for its intended purpose.

More specifically, it is an object of this invention to provide an ultrasonic tank arrangement in which the work is contained within a stationary, fluid-permeable basket, and wherein agitating elements surrounding the basket create peripheral forces which are inwardly directed throughout the entire body of fluid within the basket.

Another salient aspect of the invention lies in the use of heating and cooling units which are so distributed as effectively to surround the basket, rather than being disposed within a localized area, as a consequence of which these units in combination with the similarly distributed agitating elements, constitute in effect an array of low-velocity temperature-regulating agitators which envelope the fluid-permeable work basket, each agitator acting upon the adjacent bath region within the basket with minimal thermal lag.

Also an object of the invention is to provide an ultrasonic tank arrangement of the above-described type, which is sensitive, efficient and reliable in operation, which is non-contaminating and which can be produced at relatively low cost.

Briefly stated, in the context of an ultrasonic system, these objects are attained in an arrangement wherein a stationary fluid-permeable basket for accommodating work is suspended within a tank filled with a suitable fluid, ultrasonic transducers being operatively coupled to the tank to subject the fluid therein to ultrasonic energy. Agitating elements in the form of a rotating helical turbine, reciprocating annular blades, or similar means, are operative in the region defined between the periphery of the basket and the tank. Also disposed in this region or directly adjacent thereto are heating and cooling units, the fluid heated or cooled in the peripheral region being circulated by the agitating elements to produce mixing currents which penetrate the basket and cause the fluid therein rapidly to attain the desired temperature level.

It will be appreciated that the basic technique underlying the invention, which effects temperature corrections to the maximum liquid boundary while avoiding fluid turbulence, may be incorporated in the design of closely controlled temperature baths for any application, and that the invention is by no means limited to ultrasonically activated baths.

For a better understanding of the invention, as well as other objects and further features thereof, reference is made to the following detailed description to be read in conjunction with the accompanying drawing, wherein.

Figure 2:
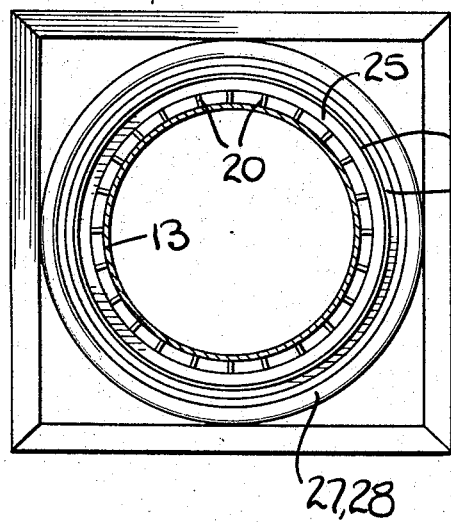
FIG. 2 is a perspective view of a portion of the basket and intermediate tank shown in FIG. 1.
Figure 3:
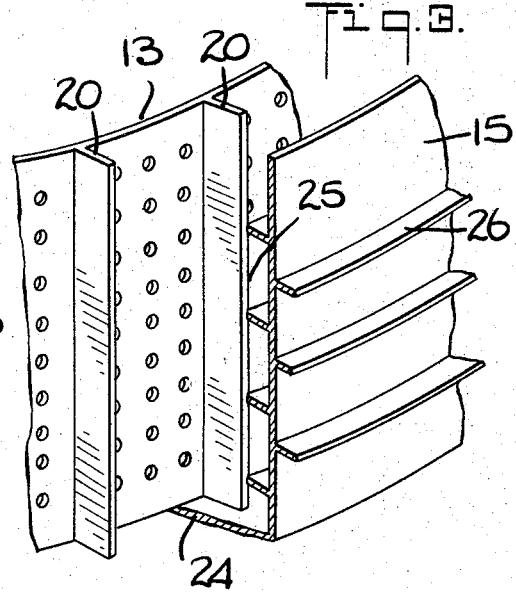
FIG. 3 is a plan view of the tank arrangement.

Referring now to the drawing, and more particularly to the embodiment shown in FIGS. 1, 2 and 3, an ultrasonic tank assembly in accordance with the invention comprises a cylindrical tank 10 having a circular rim 11 which rests on the border of an opening in a cabinet counter 12, thereby supporting the tank below the counter. A cylindrical work basket 13 is supported concentrically within the tank 10, the basket having a flange 14 which rests on the rim 11 of the tank.

Rotatably mounted within tank 10 is an intermediate tank or impeller drum 15, the tubular wall of the drum being disposed betwen the tubular wall of the basket 13 and that of the tank 10 to define a peripheral basket region BR of annular configuration between the basket and the drum, and a peripheral drum region DR of annular configuration between the drum and the tank.

A cylindrical skirt 16 is secured to the lower end of tank 10 and extends therebelow to provide a protective housing for a group of ultrasonic transducers 17 which are attached to the bottom 18 of the tank 10. The transducers are of standard design, such as piezo-electric or magnetostrictive elements, which when properly excited by a generator, produce ultrasonic energy to activate the cleaning fluid 19. Fluid 19, which may be pure water, or a detergent solution, is contained within the drum 15 and hence within the basket as well as in the peripheral basket region BR, and is also contained in the tank 10, and hence within the peripheral drum region DR. Hence the fluid within the drum constitutes an inner bath, and that outside the drum constitutes an outer bath.

The design of the ultrasonic generator and of the transducers coupled thereto forms no part of the present invention. Moreover, while the invention will be described in the context of ultrasonically activated fluid, it is to be understood that the temperature control system disclosed herein may be used with equal success to stabilize the temperature of many other forms of fluid baths in processes not making use of ultrasonics.

Work basket 13 is of mesh or perforated construction and is therefore permeable to the fluid. Attached to the work basket and extending radially therefrom at circumferentially spaced positions, is a battery of vertical fins 20 which extend into the peripheral basket region BR. The purpose of these fins, as will be explained later in greater detail, is to intercept currents of fluid set up in the basket region BR.

Drum 15 is mounted for rotation within tank 10 on a central bearing member 21, and it is driven by a variable-speed motor 22 through a shaft 23. Shaft 23 is of hollow construction, the upper end thereof, which passes through bearing 21, communicating with the interior of drum 15 and functioning, therefore, as a drain therefor. The manner of admitting fluid into the inner and outer baths is conventional and will therefore not be detailed herein.

The bottom wall 24 of the drum 15 is formed of a material selected for its transparency to ultrasonic energy in order that it behave effectively as a diaphragm to transmit ultrasonic energy conveyed through the fluid in the tank to the fluid in the drum. Suitable materials for this purpose are stainless steel shim stock, titanium, glass and polyethylene. That is to say, the diaphragm is activated by the tank fluid and serves, therefore, to activate the fluid in the drum.

Secured to the inner wall of drum 15 is a helical blade 25 which runs spirally from the top to the bottom of the drum. Rotation of the drum, therefore, causes the blade 25 to impart a spiral or cyclonic motion to the fluid within the peripheral basket region BR. Secured to the outer wall of drum 15 is a similar helical blade 26 which when the drum rotates, imparts a spiral or cyclonic motion to the fluid in the peripheral drum region DR.

Disposed within the peripheral drum region adjacent the wall of the tank 10 and submerged in the fluid therein are alternately arranged heating and cooling coils 27 and 28, the coils encircling the drum and the basket therein. In lieu of submerged heating coils, one may make use of a vulcanized heating jacket 29 wrapped about the outer wall of tank 10.

The heating and cooling units are rendered responsive to changes in fluid temperature in a conventional manner, by a thermostatic control system which includes a temperature-sensing device TS serving to measure the fluid temperature and acting through a control system CS intermittently to turn the cooling units on and off in order to maintain a constant fluid temperature level.

But since the cooling and heating units are disposed in the drum region DR and hence serve to heat or cool the fluid therein, whereas the fluid in which the work is immersed, is disposed within the basket, the problem to which the present invention is directed, is to transmit the effect of the heating and cooling units uniformly to the fluid in the interior of the basket without excessive thermal lag and without excessive agitation which may militate against cavitation efficiency.

The operation of the system is as follows:

(1) In the drum region DR, since the fluid therein is heated or cooled in response to temperature changes in the fluid environment within the work basket, by reason of the presence therein of the cooling and heating units, the first action which must be taken is to cause the fluid in the drum region DR to attain a uniform temperature throughout its body in accordance with the heating or cooling effect of the units. This is accomplished by rotation of the helical blade 26, which acts as a mixer with respect to the fluid in region DR. As a consequence, the cylindrical wall of the rotary drum, which is in contact with the fluid in region DR, attains a desired uniform temperature.

(2) Since the fluid in region DR is in heat-exchange relationship with the fluid environment in region BR, the next action is to bring the fluid in the peripheral basket region uniformly to the temperature level of the fluid in the region DR. This is accomplished by the inner helical blade 25 which imparts a swirling or cyclonic motion to the fluid within region BR.

(3) The radial fins 20 on the stationary work basket intercept the cyclonic currents of fluid within the peripheral basket region BR, and as the helical blade lifts the fluid and imparts a cyclonic motion thereto, the fluid is diverted by the fins and is caused to flow through the openings in the basket toward the interior region of the basket.

The stationary fins extend the full length of the immersed basket and the vertical spaces between the fins which entirely surround the basket, represent fluid inlets through which the heated or cooled liquid in the region BR is injected into the basket. In this manner, even though the cyclonic velocity of the fluid in region BR is maintained at a low and safe level, the action is such that the fluid is injected through each and every pore in the fluid boundary surrounding the basket, and the fluid therein rapidly attains throughout its entire body, the desired uniform temperature level. Thus, uniform, peripheral, low-velocity agitation is applied to the bath within the basket without undue agitation.

It is to be understood that while the basket, drum and tank have been shown as being cylindrical, other forms, such as open spheres or inverted cones may be used, in conjunction with the same basic thermal and agitating elements. While the heating and cooling units have been shown disposed within region DR as well as outside of the tank, in practice they may be entirely within the region DR, or entirely outside of the tank. The important requirement is that the thermal units be so dispersed as effectively to provide a thermal source at every point where mechanical agitation of the fluid is initiated.

In the embodiment described above, the work is contained in a stationary basket free from encumbrances, and the basket is surrounded by the rotary drum which isolates the inner bath fluid in the basket from the outer bath fluid in the drum region DR between the drum and the outer tank 10. The value of this arrangement is that contamination of the fluid in the basket is avoided, for the cooling and heating units contained in the drum region make no contact with the fluid in the basket. To further minimize the danger of contamination, contamination-free plastics or glass may be used for the basket and drum, rather than metal.

Figures 1, 4:
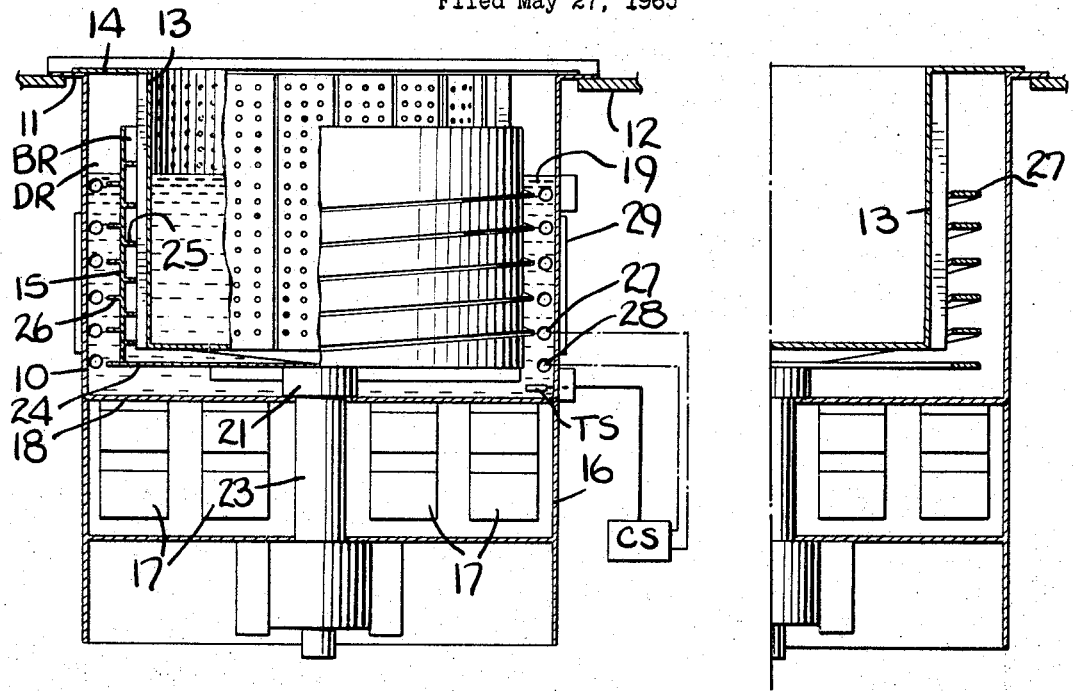
FIG. 1 is a sectional view of one preferred embodiment of a tank arrangement having a temperature regulator in accordance with the invention.
FIG. 4 is a fragmentary view of a modified tank arrangement.

When contamination is not a factor, one may, as shown in FIG. 4, dispense with the rotary drum which divides the chamber into inner and outer fluid baths, and in lieu thereof, use a rotating impeller 27 on an open frame in the space between the basket and the outer tank. In this case, the rotary impeller may be an open frame or cage having a helical blade attached thereto, or the impeller element may take the form of cups or other expedients to impart a rotary low-velocity motion to the fluid, to produce thermal currents about the boundary of the basket, which currents are intercepted by the fins thereon.

While preferred embodiments of my invention have been shown and described, it will be appreciated that many changes and modifications may be made therein without, however, departing from the essential spirit of the invention as defined in the annexed claims.

What I claim is:
1. A temperature-regulated fluid bath arrangement comprising,
   (a) a tank for containing fluid,
   (b) a basket suspended within said tank and permeable to said fluid whereby the internal region of said tank is filled with fluid, the periphery of said basket being spaced from the wall of said tank to define an external fluid region,
   (c) thermostatically controlled means to regulate the temperature of fluid in said external region, and
   (d) means including a rotary drum concentrically disposed between said basket and said tank and including a helical blade on the side adjacent the basket and a helical blade on the side adjacent the tank to agitate the fluid within said external region to produce mixing currents which penetrate said basket and which render the temperature of the fluid within the internal region uniform.
2. An arrangement, as set forth in claim 1, further including a vertical array of radial fins extending from said basket to interrupt said mixing currents.
3. A temperature-regulated fluid bath arrangement comprising,
   (a) a tank for containing fluid,
   (b) a basket suspended within said tank and permeable to said fluid whereby the internal region of said tank is filled with fluid, the periphery of said basket being spaced from the wall of said tank to define an external fluid region, said basket having a vertical array of radial fins extending therefrom into said external region,
   (c) thermostatically controlled means to regulate the temperature of fluid in said external region, and
   (d) means including a rotary drum having impeller elements on either side thereof and concentrically mounted between said basket and said tank to agitate the fluid within said external region to produce mixing currents which penetrate said basket and which render the temperature of the fluid within the internal region uniform.
4. An arrangement, as set forth in claim 3, wherein said drum is impermeable to fluid to prevent contamination of the fluid within said basket.
5. An arrangement, as set forth in claim 3, further including ultrasonic transducers attached to the bottom of said tank to produce ultrasonic energy to activate the fluid in said internal region.
6. An arrangement as set forth in claim 5 wherein the bottom of said rotary drum is effectively transparent to ultrasonic energy.
7. An arrangement as set forth in claim 5 further including a motor to drive said drum through a hollow shaft which communicates with said drum to provide a drain therefor.

References Cited

UNITED STATES PATENTS

| | | | |
|---|---|---|---|
| 1,678,037 | 7/1928 | Dunn | 134—182 |
| 1,747,321 | 2/1930 | Reese | 134—193 X |
| 2,151,354 | 3/1939 | Osuch | 134—57 X |
| 2,468,550 | 4/1949 | Fruth | 68—3 X |
| 2,666,439 | 1/1954 | Bechtol | 134—57 |
| 2,941,908 | 6/1960 | Logan | 134—57 X |
| 2,985,003 | 5/1961 | Gelfand et al. | 134—184 X |
| 3,108,031 | 10/1963 | Hasala et al. | 134—105 X |

FOREIGN PATENTS 30,563  4/1911  Sweden.

CHARLES A. WILLMUTH, *Primary Examiner.*
R. L. BLEUTGE, *Assistant Examiner.*